US010419062B2

(12) United States Patent
Doane et al.

(10) Patent No.: US 10,419,062 B2
(45) Date of Patent: Sep. 17, 2019

(54) SIMULTANEOUS TRANSMIT AND RECEIVE WITH DIGITAL PHASED ARRAYS

(71) Applicants: Jonathan P. Doane, Arlington, MA (US); Kenneth E. Kolodziej, Lexington, MA (US); Bradley T. Perry, Nashua, NH (US)

(72) Inventors: Jonathan P. Doane, Arlington, MA (US); Kenneth E. Kolodziej, Lexington, MA (US); Bradley T. Perry, Nashua, NH (US)

(73) Assignee: Massachusetts Institute of Technology, Cambridge, MA (US)

(*) Notice: Subject to any disclaimer, the term of this patent is extended or adjusted under 35 U.S.C. 154(b) by 147 days.

(21) Appl. No.: 15/782,370

(22) Filed: Oct. 12, 2017

(65) Prior Publication Data

US 2018/0115342 A1 Apr. 26, 2018

Related U.S. Application Data (60) Provisional application No. 62/407,230, filed on Oct. 12, 2016.

(51) Int. Cl.
| | |
|---|---|
| H04B 1/525 | (2015.01) |
| H04B 1/04 | (2006.01) |
| H04B 1/44 | (2006.01) |
| H01Q 3/26 | (2006.01) |
| H01Q 3/30 | (2006.01) |
| H01Q 21/22 | (2006.01) |
| H01Q 3/24 | (2006.01) |
| H01Q 21/06 | (2006.01) |

(52) U.S. Cl.
CPC ............ *H04B 1/525* (2013.01); *H01Q 3/247* (2013.01); *H01Q 3/2611* (2013.01); *H01Q 3/30* (2013.01); *H01Q 21/065* (2013.01); *H01Q 21/22* (2013.01); *H04B 1/0458* (2013.01); *H04B 1/44* (2013.01)

(58) Field of Classification Search
CPC ........ H04B 1/525; H04B 1/44; H04B 1/0458; H01Q 3/247; H01Q 21/065; H01Q 3/30; H01Q 3/2611; H01Q 21/22
See application file for complete search history.

(56) References Cited

U.S. PATENT DOCUMENTS

| | | | | |
|---|---|---|---|---|
| 5,418,849 A * | 5/1995 | Cannalire | ............... | H04B 3/23 370/290 |
| 6,704,349 B1 * | 3/2004 | Masenten | ............. | H04B 1/123 375/219 |
| 8,749,441 B2 * | 6/2014 | Fenn | ...................... | H01Q 1/525 343/793 |

(Continued)

OTHER PUBLICATIONS

Ahmed, et al.; "All-Digital Self-Interference Cancellation Technique for Full-Duplex Systems;" IEEE Transactions on Wireless Communications, vol. 14; No. 7; Jul. 2015; 14 pages.

(Continued)

*Primary Examiner* — Lewis G West
(74) *Attorney, Agent, or Firm* — Daly, Crowley, Mofford & Durkee, LLP (57) ABSTRACT

A method and apparatus for achieving simultaneous transmit and receive operation with a digital phased array is described. Digital beamforming and cancellation enables adjacent transmitting and receiving sub-arrays to operate simultaneously in the same frequency band.

15 Claims, 7 Drawing Sheets

(56) References Cited

U.S. PATENT DOCUMENTS

| | | | | |
|---|---|---|---|---|
| 10,225,112 | B1* | 3/2019 | Doane | H04L 25/03343 |
| 2013/0301487 | A1* | 11/2013 | Khandani | H04W 16/14 |
| | | | | 370/278 |
| 2014/0111373 | A1* | 4/2014 | Puzella | G01S 7/032 |
| | | | | 342/174 |
| 2015/0270865 | A1* | 9/2015 | Polydoros | H04B 1/62 |
| | | | | 375/346 |
| 2015/0318976 | A1* | 11/2015 | Eltawil | H04B 1/123 |
| | | | | 370/278 |
| 2017/0019128 | A1* | 1/2017 | Pack | H04B 1/0475 |
| 2017/0257136 | A1* | 9/2017 | Gianvittorio | H04B 1/44 |
| 2017/0359092 | A1* | 12/2017 | Dufrene | H04B 1/1027 |
| 2018/0006794 | A1* | 1/2018 | Lee | H04L 5/14 |
| 2018/0063745 | A1* | 3/2018 | Jain | H04B 10/25752 |

OTHER PUBLICATIONS

Antweiler; "Multi-Channel System Identification with Perfect Sequences;" Theory and Applications; Chapter 7; Advances in Digital Speech Transmission; John Wiley & Sons, Ltd.; 2008; 28 pages.

Aryafar, et al.; "MIDU: Enabling MIMO Full Duplex;" Proceedings of the 18th Annual International Conference on Mobile Computing and Networking; ACM; Aug. 22-26, 2012; 12 pages.

Bharadia, et al.; "Full Duplex Radios;" ACM SIGCOMM Computer Communication Review; vol. 43; No. 4; Aug. 12-16, 2013; 12 pages.

Bliss, et al.; "Simultaneous Transmission and Reception for Improved Wireless Network Performance;" 2007 IEEE/SP 14th Workshop on Statistical Signal Processing; IEEE 2007; 5 pages.

Choi, et al.; "Achieving Single Channel, Full Duplex Wireless Communication;" Proceedings of the Sixteenth Annual International Conference on Mobile Computing and Networking; ACM; Sep. 20-24, 2010; 12 pages.

Cox, et al.; "Demonstration of a Single-Aperture, Full-Duplex Communication System;" 2013 IEEE Radio and Wireless Symposium; Jan. 2013; 3 pages.

Day, et al.; "Full-Duplex Bidirectional MIMO: Achievable Rates Under Limited Dynamic Range;" IEEE Transactions on Signal Processing; vol. 60; No. 7; Jul. 2012; 12 pages.

Dinc, et al.; "A T/R Antenna Pair with Polarization-Based Reconfigurable Wideband Self-Interference Cancellation for Simultaneous Transmit and Receive;" 2015 IEEE MTT-S International Microwave Symposium; IEEE 2015; 4 pages.

Duffy, et al.; "Integrated Compensation Network for Low Mutual Coupling of Planar Microstrip Antenna Arrays;" 2007 IEEE Antennas and Propagation Society International Symposium; IEEE 2007; 4 pages.

Fitz, et al.; "Towards Simultaneous Radar and Spectral Sensing;" 2014 IEEE International Symposium on Dynamic Spectrum Access Networks: SSPARC Workshop; 2014; 5 pages.

Fulton, et al.; "Digital Phased Arrays: Challenges and Opportunities;" Proceedings of the IEEE; vol. 104; No. 3; Mar. 2016; 17 pages.

Gerber; "Adaptive Transmit Beamforming for Simultaneous Transmit and Receive;" Master's Thesis; Massachusetts Institute of Technology; Jul. 2011; 121 pages.

Goodman, et al.; "Extending the Dynamic Range of RF Receivers Using Nonlinear Equalization;" 2009 International Waveform Diversity and Design Conference; IEEE; 2009; 5 pages.

Hua, et al; "A Method for Broadband Full-Duplex MIMO Radio;" IEEE Signal Processing Letters; vol. 19; No. 12; Dec. 2012; 4 pages.

Johnston, et al.; "Full-Duplex Communication Via Adaptive Nulling;" 2013 Asilomar Conference on Signals, Systems and Computers, Nov. 2013; 4 pages.

Khodaei, et al.; "A Practical Miniaturized U-Slot Patch Antenna with Enhanced Bandwidth;" Progress in Electromagnetics Research B; vol. 3; 2008; 16 pages.

Kolodziej, et al.; "Multitap RF Canceller for In-Band Full-Duplex Wireless Communications;" IEEE Transactions on Wireless Communications; vol. 15; No. 6; Jun. 2016; 14 pages.

Kolodziej, et al.; "Ring Array Antenna with Optimized Beamformer for Simultaneous Transmit and Receive;" Proceedings of the 2012 IEEE International Symposium on Antennas and Propagation; IEEE; 2012; 2 pages.

Liang, et al.; "Digital Self-Interference Cancellation for Full-Duplex MIMO Systems;" 2015 International Wireless Communications and Mobile Computing Conference (IWCMC); Aug. 2015; 5 pages.

Moulder, et al.; "Wideband Antenna Array for Simultaneous Transmit and Receive (STAR) Applications;" 2014 IEEE Antennas and Propagation Society International Symposium (APSURSI); IEEE 2014; 2 pages.

Riihonen, et al.; "Analog and Digital Self-Interference Cancellation in Full-Duplex MIMO-OFDM Transceivers with Limited Resolution in A/D Conversion;" 2012 Conference Record of the Forty Sixth Asilomar Conference on Signals, Systems and Computers (ASILOMAR); Nov. 2012; 5 pages.

Riihonen, et al.; "Mitigation of Loopback Self-Interference in Full-Duplex MIMO Relays;" IEEE Transactions on Signal Processing; vol. 59; No. 12; Dec. 2011; 11 pages.

Snow, et al.; "Concurrent Multifunction Transmit and Receive Applications with Dynamic Filtering;" 2010 International Symposium on Phased Array Systems and Technology (ARRAY); Oct. 2010; 6 pages.

Snow, et al.; "Transmit-Receive Duplexing Using Digital Beamforming System to Cancel Self-Interference;" IEEE Transactions on Microwave Theory and Techniques; vol. 59; No. 12; Dec. 2011; 10 pages.

Wegener; "Broadband Near-Field Filters for Simultaneous Transmit and Receive in a Small Two-Dimensional Array;" 2014 IEEE MTT-S International Microwave Symposium (IMS2014); Jun. 2014; 3 pages.

Wegener, et al.; Coupled Antenna Scheme Using Filter Design Techniques and Tunable Resonators to Show Simultaneous Transmit and Receive; Microwave Symposium Digest (IMS) 2013 IEEE MTT-S International; Jun. 2013; 4 pages.

Zhou, et al.; "Integrated Wideband Self-Interference Cancellation in the RF Domain for FDD and Full-Duplex Wireless;" IEEE Journal of Solid-State Circuits; vol. 50; No. 12; Dec. 2015; 17 pages.

* cited by examiner

SIMULTANEOUS TRANSMIT AND RECEIVE WITH DIGITAL PHASED ARRAYS

CROSS REFERENCE TO RELATED APPLICATION

This application claims the benefit under U.S.C. § 119(e) of U.S. Provisional Application No. 62/407,230 filed Oct. 12, 2016, titled "SIMULTANEOUS TRANSMIT AND RECEIVE WITH DIGITAL PHASED ARRAYS" which is incorporated here by reference in its entirety.

GOVERNMENT RIGHTS

This invention was made with Government support under Contract No. F A8721-05-C-0002 awarded by the U.S. Air Force. The Government has certain rights in the invention

BACKGROUND

As is known in the art, simultaneous Transmit and Receive (STAR) is an emerging area of interest that offers significant benefits for many applications including communications, radar, spectral sensing. and multifunctional systems. One challenge in implementing practical STAR is mitigating the effects of strong in-band self-interference (SI) at the receiver(s). Various techniques have been proposed to accomplish this which may be broadly categorized into several domains.

Propagation domain methods include natural antenna isolation from physical separation and placement, along with polarization diversity and decoupling structures. Temporal domain methods involve subtracting a filtered copy of the transmitted waveform from the received waveform and may be performed in the analog domain, or in the digital domain using adaptive filtering and non-linear equalization. Finally, spatial domain methods use multiple transmit (receive) antennas to create spatial nulls at one or more receive (transmit) antennae.

To effectively enable STAR, multiple techniques are often combined, typically with an analog circuit layer to reduce transmit noise and to avoid receiver saturation followed by a digital cancellation circuit layer. For large arrays, many single-channel analog domain techniques are impractical due to dense element spacing and the multitude of transmit and receive channel pairs.

Spatial domain cancellation is, of course, a natural choice for phased array antennas. High-isolation apertures have been proposed to achieve spatial domain cancellation using symmetrically placed antenna elements, however these systems are not suitable for general far-field directional beamforming. Another solution for phased array antennas has been to combine spatial beamforming and digital cancellation, which has been previously explored for the related problem of full-duplex multiple-input multiple-output (MIMO) radios. The overall performance of existing techniques, however, is ultimately limited by the dynamic range of the individual transmit and receive channels. This represents a challenge for high power array antennas which require extremely high isolation, often of 140 dB or more, to support STAR, but whose transmitters may operate near saturation and produce significant distortion and noise.

SUMMARY

A method and apparatus for achieving simultaneous transmit and receive operation with a digital phased array is described. Digital beamforming and cancellation enables adjacent transmitting and receiving sub-arrays to operate simultaneously in the same frequency band.

In accordance with one aspect of the concepts described herein, in a phased array antenna system comprising a phased array antenna provided form a plurality of antenna elements and with each antenna element having at least one of a plurality of transmit-receive (TR) modules coupled thereto and the phased array antenna partitioned into first and second sub-array antennas, a method for simultaneous transmit and receive (STAR) operation comprises transmitting, via the first sub array, a signal through a transmit channel of each TR module in the first subarray; coupling a portion of the transmitted signal from the transmit channel to an auxiliary receive channel coupled to the same antenna element as the transmit signal path; receiving, via the second sub-array antenna, a receive signal comprising at least a portion of a signal of interest and at least a portion of the transmit signal; and combining the coupled signal from the auxiliary receive channel and the receive signal to generate an isolated signal, wherein the isolated signal is generated using the portion of the transmitted signal from the auxiliary receive channel.

The method may further include one or more of the following features either taken individually or in any combination: wherein combining the coupled signal from the auxiliary receive channel and the receive signal may comprise providing signals from a plurality of auxiliary receive channels to an adaptive digital canceler, providing signals from a plurality of receive channels coupled to the second sub-array antenna to the digital canceler and combining the signal from the plurality of auxiliary receive channels with the signals from the plurality of receive channels to generate the isolated signal; wherein providing signals from the plurality of receive channels coupled to the second sub-array antenna to the digital canceler may comprise providing signals from the plurality of receive channels coupled to the second sub-array antenna to a digital receive beamformer, forming one or more beamformed received signals and providing the one or more beamformed received signal from the digital receive beamformer to the adaptive digital canceler; wherein the combining may further comprise summing the portions of the transmitted signals from the auxiliary receive channels with the beamformed received signal.

In accordance with a further aspect of the concepts described herein, a simultaneous transmit and receive system comprises a receive subarray antenna provided from a first plurality of antenna elements; a transmit subarray antenna provided from a second plurality of antenna elements; a first plurality of transmit channels each having an input and having an output and each configured to be selectively coupled to a respective one of said first plurality antenna elements in said transmit sub-array antenna; a first plurality of auxiliary receive channels each having an input and having an output and each configured to be selectively coupled to a respective one of said first plurality antenna elements in said transmit sub-array antenna; a first plurality of coupling elements, each of said first plurality of coupling elements coupled one said first plurality of auxiliary receive channels and a corresponding one of said first plurality of transmit channels; and an adaptive digital canceler having plurality of inputs coupled to the outputs of said first plurality of auxiliary receive channels.

The method may further include one or more of the following features either taken individually or in any combination: the STAR system may further include a plurality of receiver channels, each having an input coupled to said receive subarray antenna and each having an output coupled to an adaptive digital canceler; the STAR may further include a digital receive beamformer coupled between the outputs of said plurality of receiver channels and an input of said adaptive digital canceler; the STAR system may further include a transmit signal source having an output port and a digital transmit beamformer having an input port coupled to the output port of said transmit signal source and having a plurality of outputs, each of the digital transmit beamformer outputs coupled to a corresponding one of the inputs of said first plurality of transmit channels.

In accordance with a still further aspect of the concepts described herein, a radio frequency (RF) system comprises a plurality of transmit-receive (T/R) modules, each transmit-receive module comprising at least one a receive channel and a transmit channel; a coupling element configured to couple RF signals from said transmit channel to said receive channel; an adaptive canceler having a plurality of inputs and an output, each of said plurality of inputs coupled to a corresponding one said receive channels, such that in response to an RF transmit signal propagating in said transmit channel, said coupling element couples portion of the RF transmit signal to one of the plurality of inputs of said adaptive canceler.

The method may further include one or more of the following features either taken individually or in any combination: the adaptive canceler may be configured to generate a cancel signal based upon the signal to be sent; the RF system may further comprise a second plurality of (T/R) modules and wherein said adaptive canceler is configured to generate an isolated signal based upon the cancel signal and a plurality of signals provided thereto from said second plurality of (T/R) modules; the RF system may further comprise a digital receive beamformer having a plurality of inputs coupled to outputs of said second plurality of T/R modules, and having an output coupled to said adaptive canceler, wherein in response to signals provided thereto from said second plurality of T/R modules, said digital receive beamformer summates the plurality of signals provided thereto and provides a receive beam signal to said adaptive canceler; the adaptive canceler may combine the signals provided thereto from said first and second plurality of T/R modules to provide an isolated receive signal; at least one a receive channel may correspond to an auxiliary receive channel; at least some T/R modules may comprise a T/R switch coupled between said transmit channel and said receive channel.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Described herein is a system for implementing simultaneous transmit and receive (STAR) in phased-array antennas. The system utilizes an auxiliary receive channel, digital transmit and receive beamformers and an adaptive digital canceler. It should be appreciated that to promote clarity in the description of the broad concepts, systems and techniques sought to be protected, the systems and techniques have been substantially described in the context of a single transmit and receive beamformer which operate with a single beam, It is, of course, recognized that the concepts, systems and techniques may operate with a multiplicity of transmit signals and a multiplicity of transmit beamformers that may be digitally combined to feed a plurality of transmit channels.

Figure 1:
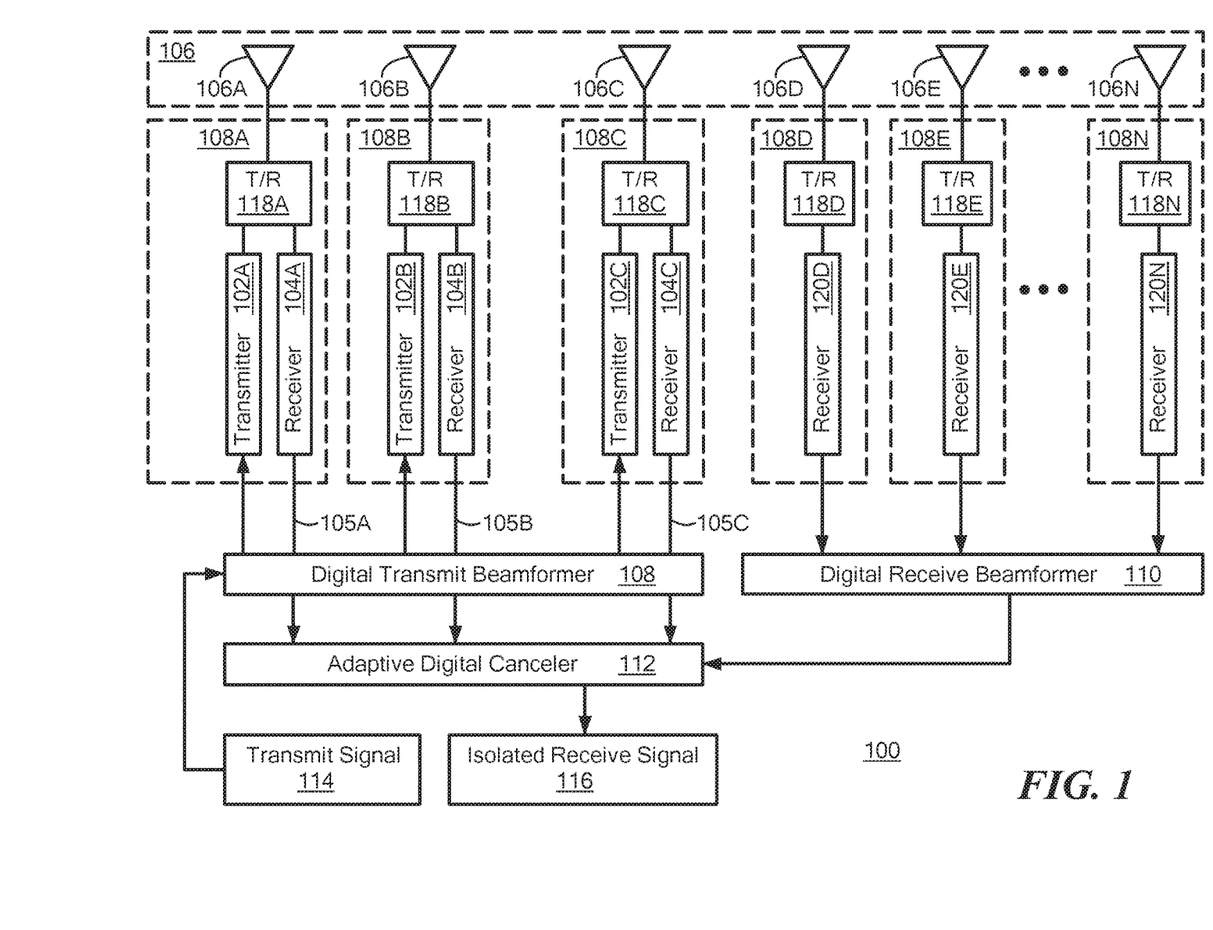
FIG. 1 is a block diagram of a phased array antenna system suitable for simultaneous transmit and receive operation, according to an embodiment.

Likewise, a receive beamformer may implement multiple beams and thus the concepts, systems and techniques may operate with a multiplicity of receive beamformers (each working with a copy of the received signals from receive channels). Each receive beamformer would produce a separate receive signal and would require a corresponding digital canceller and cancel signal with the same multiplicity. Referring now to FIG. 1, a phased-array antenna system 100 for simultaneous transmit and receive (STAR) operation includes a phased-array antenna 106 comprised of a plurality of antenna elements 106A-106N. Each antenna element 106 is coupled to a corresponding one of a plurality of transmit/receive (T/R) modules (also sometimes referred to herein as transceivers) 108A-108O. In some embodiments, the number of T/R modules may equal the number of antenna elements (i.e. O=N) while in other embodiments the number of T/R modules may differ from the number of antenna elements. For example, in some embodiments a single one of the T/R modules may be coupled to multiple antenna elements (i.e. O<N) while in other embodiments multiple T/R modules may be coupled to a single antenna element (i.e. O>N). In the illustrative embodiment of FIG. 1, the number of T/R modules 108 matches the number of antenna elements 106 (i.e. O=N). Each T/R module includes a transmit channel 102A-102O and a receive channel 104A-104O. For reasons which will become apparent from the description herein below, not all T/R modules 108 in FIG. 1 are explicitly shown to include both a transmit and receive channel.

The system 100 further includes a digital transmit beamformer 108, a digital receive beamformer 110, and an adaptive digital canceler 112. Transmit beamformer 108 is configured to provide signals to transmit channels of selected ones of the T/R modules and receive signals from receive channels of the selected T/R modules. As will be explained in detail further below, the digital transmit beamformer processes the transmit signal(s) 114 provided thereto, and provides each transmit channel 102 with the appropriate filtered waveform to produce the desired spatial distribution of radiated fields. Observation receivers 104A-104C provide signals to canceler 112 via respective ones of signal paths 105A-105C.

It should be appreciated that phased-array antenna system 100 may include any number of transceivers and in preferred embodiments each transceiver within the system 100 may comprise a transmit channel, a receive channel, and a transmit/receive (T/R) switch 118 or other circuit to isolate the transmit and receive channels and through which the transmit and receive channels may be coupled to respective ones of the antenna elements 106. In the case of a T/R switch (or other controllable circuit element), the transmit and receive channels may be selectively coupled to respective ones of the antenna elements (hence providing the ability to selectively and dynamically form different transmit and receive sub-array antennas).

The phased-array antenna 106 may be configured or partitioned into a transmit sub-array that includes transceivers configured to support a transmit mode of operation of system 100 and a receive sub-array that includes transceivers configured to support a receive mode of operation of system 100.

In the particular example of FIG. 1, T/R modules 108A-108C are configured to support a transmit mode of operation of system 100. In the transmit mode of operation, a transmit signal source 114 generates a transmit signal and provides the transmit signal to digital transmit beamformer 108. Transmit signals are coupled through beamformer 108 to inputs of the transmit channels in selected ones of the T/R modules 108. As will be described in detail below, both the transmit channel and receive channel of transmit T/R modules configured transmit operation are utilized to implement STAR operation. Hence both transmit and receive channels are illustrated on transmit-configured T/R modules 108A-108C.

T/R modules 108D-108N, on the other hand are configured to support a receive mode of operation of system 100. In a receive mode, only receive channels of the T/R modules are used. Hence, only receive channels are illustrated in T/R modules 108D-108N. Thus, in the example of FIG. 1, system 100 is configured to include a transmit sub-array that includes antenna elements 106A-106C, and T/R modules 108A-108C. Further, the system 100 includes a receive sub-array which includes antenna elements 106D-106N and T/R modules 108D-108N. A discussion regarding the configuration of transceivers may be found below and in conjunction with FIG. 3.

In an embodiment, the digital transmit beamformer 108 may receive a transmit signal from transmit signal source 114. The digital transmit beamformer 108 may encompass a digital signal processor (DSP) coupled to a memory (including, but not limited to, a ROM, EPROM, EEPROM, flash memory, HDD, or any combination thereof). The digital transmit beamformer 108 may process the signals provided thereto in accordance with known techniques to perform digital beamforming and may convert the transmit signal 114 into analog signals to be provided to each of the transmit-configured T/R modules in the transmit sub-array along a transmit signal path. The analog transmit signals are emitted via antenna elements 106A-106C which provide a desired near-field and far-field radiation pattern for the transmission of the transmit signal 114.

As noted above, the transmit beamformer may implement multiple signals and/or multiple beams. Thus, in some embodiments, the system may include a multiplicity of transmit signals 114, and multiplicity of transmit beamformers 108, that are then digitally combined to feed each of the transmit channels 102.

According to an embodiment, the desired beam pattern may include spatial cancellation (deconstructive interference patterns) to reduce (and ideally minimize) the total coupled power incident at each receiver 120 (i.e. via transmit signals coupled to the receiver via the receive sub-array in response to the transmit signal emitted via the transmit sub-array), while maintaining desired far field pattern characteristics such as scan angle, gain, and side-lobe level. For example, the digital transmit beamformer 108 may convert transmit signal 114 into analog signals provided to transmitter channels 102A-102C of T/R modules 108A-108C so that when those analog signals propagate through the transmit channels 102A-102C and are emitted via antenna element 106A-106C, they form a desired radiation pattern.

According to an embodiment, each transmit channel 102 within the transmit sub-array is coupled to an auxiliary receive channel 104 (also sometimes referred to herein as a so-called "unused" receive channel 104; the receive channel is referred to as "unused" since it is not used in the transmission of a transmit signal through the T/R module, however, as will be described below, the so-called "unused" receive channel is actually used for another purpose—i.e. a purpose other than to transmit a signal in the transmit signal path). In particular, each transmit channel 102 may be configured such that a portion of a transmit signal provided thereto from the digital transmit beamformer 108 may be coupled from the transmit channel to the auxiliary receive channel 104.

For example, the digital transmit beamformer 108 may provide signals to transmit channels 102A, 102B, and 102C in order to emit a desired transmit signal through the antenna elements which form the transmit sub-array. A portion of the transmit signal is coupled from the transmit channel 102A (and ideally from a portion of the transmit channel as close as possible to the output of the T/R module) to the auxiliary receive channel 104A. Similarly, a portion of the transmit signal in transmit channel 102B is coupled to auxiliary receive channel 104B, and a portion of the transmit signal in transmit channel 102C is coupled to auxiliary receive channel 104C. The auxiliary receive channels 104A, 104B, 104C process the signals provided thereto from the respective ones of the transmit channels 102A, 102B, 102C and provide their received portions of the transmit signal along an auxiliary receive path to a digital canceler 112 which may, for example, be provided as an adaptive digital canceler.

Digital canceler 112 may comprise a DSP coupled to a memory (such as a ROM, EPROM, EEPROM, flash memory, HDD, to name a few examples). Once the digital canceler 112 receives the portions of the transmit signal through the auxiliary receive path, the digital canceler 112 may generate a cancel signal based upon the received portions of the transmit signal. For example, coupled auxiliary (or "unused") receivers 104A, 104B, 104C may provide the portions of signals received from respective ones of transmitters 102A, 102B, 102C to canceler 112. The adaptive digital canceler 112 may then generate a so-called "cancel signal" based upon the portions of signals provided thereto through receive channels 104A, 104B, 104C.

In an embodiment, receive channels 120 within the receive sub-array may receive a portion of a transmit signal concurrently as transmitters 102 are transmitting the desired transmit signal from the transmit sub-array formed form the antenna elements 106A, 106C. Due at least in part to mutual coupling between the antenna elements in the receive sub-array and antenna elements in the transmit subarray, each receive channel 120 may receive a portion of the transmit signal as the transmit signal is emitted through the transmit sub-array. Such mutual coupling may be a result of a variety of factors including, but not limited to, proximity of antenna elements, power level of the transmit signal, shape and sidelobe levels and positions of the transmit and receive beams. Thus, each signal received via receive antenna elements includes the signal of interest and a portion of the transmitted signal.

Each receive channel 120 may further provide its signal which includes the signal of interest and its portion of the transmitted signal to the digital receive beamformer 110. The digital receive beamformer 110 may encompass a digital signal processor (DSP) coupled to a memory (such as a ROM, EPROM, EEPROM, flash memory, HDD, or any combination thereof—to name a few examples). The receive beamformer 110 may convert the received signals which include portions of the transmitted signals from the receive sub-array into a digital received signal. The receive beamformer implements a desired near-field and far-field radiation pattern for the reception of both signals transmitted from the transmitters 102 as well as external signals incident on the array. As noted above, the receive beamformer may implement multiple beams. Thus, in some embodiments, the system may include a multiplicity of beamformers 110 (each working with a copy of the received signals from receive channels 120). Each receive beamformer would produce a separate receive signal 230, and would require a corresponding digital canceller 112 and cancel signal 220 with the same multiplicity.

According to an embodiment, the desired receive beam pattern may include spatial cancellation (deconstructive interference patterns) to reduce (and ideally minimize) the total accepted power from each transmitter 102 (i.e. via transmit signals coupled to the receiver via the receive sub-array in response to the transmit signal emitted via the transmit sub-array), while maintaining desired far field receive pattern characteristics such as scan angle, gain, and side-lobe level to optimize reception of desired external signals. Ultimately the digital receive beamformer outputs a digital received signal comprised of a portion of each of the received signals from receive channels 120. This may, for example, be achieved through an adaptive beamforming algorithm such as Minimum Variance Distortionless Response (MVDR) or Linear Constrained Minimum Variance (LCMV). For example, the receiver transmit beamformer 110 may receive portions of a transmitted signal from receive channels 120A, 102B, 120C.

According to an embodiment, the digital receiver beamformer 110 may provide the received signal to the adaptive digital canceler 112. The adaptive digital canceller 112 may then combine the signal from the digital receive beamformer 110 with each of the reference signals from receivers 104. Because the reference signals from receivers 104 contain copies of the signal, distortion, and noise that is generated by transmit channels 102, the adaptive digital canceller may be configured to minimize or eliminate the contribution of the undesired transmitted self-interference that may be present in the received signal. The resulting isolated receive signal 116 may then represent a good estimate of any desired external signal(s) that may have been generated from an external source and incident on the receive antennas 106.

Figure 2:
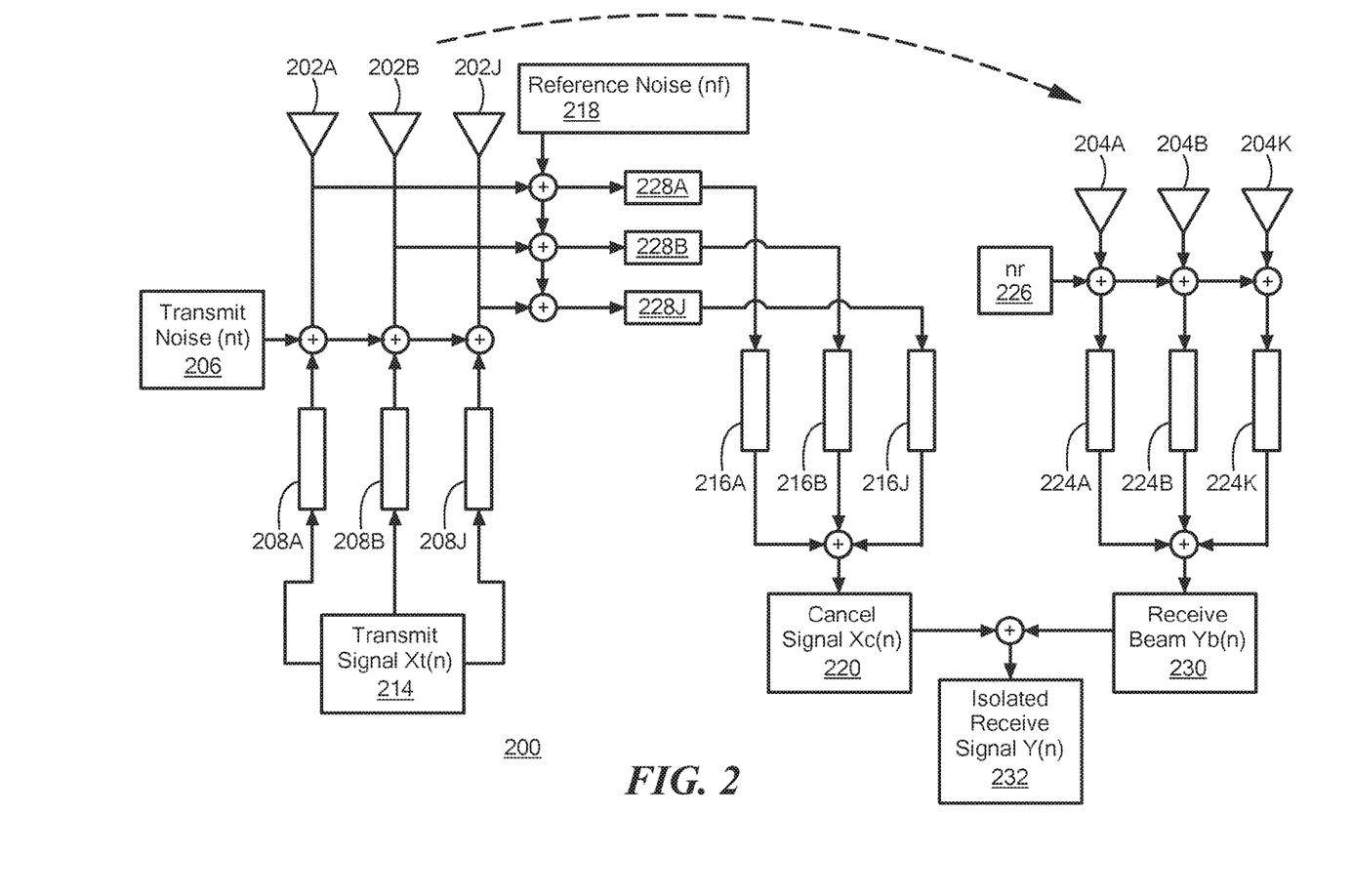
FIG. 2 is a signal-flow diagram for simultaneous transmit and receive in a phased array antenna system, according to an embodiment.

Referring now to FIG. 2, a signal-flow diagram for a simultaneous transmit and receive (STAR) system such as that described above in conjunction with FIG. 1 illustrates that, in an embodiment, a transmit signal source 214 generates a transmit signal which may be passed through a multi-channel transmit beamforming filter 208 having J channels. The multi-channel transmit beamforming filter 208 may, as an example, be the same or similar to digital transmit beamformer 108 described above in conjunction with FIG. 1. The multi-channel transmit beamformer processes the signals provided thereto from transmit signal source 214 into a desired set of transmit signals provided via J transmit channels to respective ones of transmit elements 202A-202J. The reference letter J may represent the number of transceivers within the transmit sub-array. The desired signals are passed from the multi-channel beamforming filter 208 on J transmit channels and may be emitted via J transmit antenna elements 202. Transmit elements 202 may, for example, include transmit channels of T/R modules such as the T/R modules described above in FIG. 1.

In an embodiment, before the desired transmit signal is emitted via transmit elements 202, transmit noise (represented as element 206 in FIG. 2) may be introduced on each transmit channel. Transmit noise 206 may comprise noise and distortion added due a variety of factors including, but not limited to, nonlinearities of transmit circuitry and power amplifiers within transmit elements 202. The signals transmitted by each transmit element 202 may be defined as:

$$x_t^j(n)=h_t^j*x(n)+n_t^j(n), 1\leq j\leq J \qquad [\text{Eq. 1}]$$

Wherein $x_t$ is the signal transmitted by each transmit element 202, $h_t$ is the response of the transmit beamformer, $n_t(n)$ is the transmit noise 206, j is the channel, and * represents convolution.

According to an embodiment, portions of the transmitted signal are coupled from the transmit path, via auxiliary receive channels 228A-228J, to a digital canceler 216. Auxiliary receive channels may, for example, be the same as or similar to the auxiliary (or "unused") receive channels described above in conjunction with FIG. 1. Digital canceler 216 may, for example, be the same as or similar to adaptive digital canceler 112 described above in conjunction with FIG. 1.

The so-coupled portions of the transmit signal may be provided to the digital canceler 216 via auxiliary receive channels. For example, a portion of the transmitted signal propagating through transmit element 202A may be provided to a digital canceler via an auxiliary receive channel that includes an auxiliary receive channel coupled to transmit element 202. These coupled auxiliary receive channels may include, as an example, auxiliary receive channels 104 coupled to transmitters 102 as described above in conjunction with FIG. 1.

In an embodiment, before the portions of the transmitted beamform are passed to the digital canceler 216, reference channel noise (represented via reference element 218 in FIG. 2) may be introduced on each auxiliary receive channel. The signals propagating through each channel to the digital canceler 216 may be defined as:

$$x_f^j(n)=h_f^j*[x_t^j(n)+n_f^j(n)], 1\leq j\leq J \qquad [\text{Eq. 2}]$$

wherein $h_f$ is the coupling response from a transmit element 102 to its auxiliary (unused) coupled receiver and $n_f(n)$ is reference noise.

According to an embodiment, digital canceler 216 receives the signals provided thereto from the auxiliary channels and may generate a "so-called" cancel signal 220 from the signals provided to the digital canceler 216 via the auxiliary receive channel. Cancel signal 220 may, for example, be a summation of all signals passed to the digital canceler 216 along the auxiliary receive channel. In an embodiment, the cancellation signal may be represented as:

$$x_c(n)=\Sigma_{j=1}^J h_c^j*x_f^j(n) \qquad [\text{Eq. 3}]$$

wherein $h_c$ is the response of the auxiliary response channel of the canceling filter.

In an embodiment, concurrent with a transmit signal being emitted via transmit elements 202, receive elements 204 may receive a receive signal with each receive element 204 receiving a portion of the receive signal. The receive elements 204 may, for example, include receive channels 120 described above in conjunction with FIG. 1. In addition to the receive signal, at least some (or in some instances all) receive elements 204 may also receive at least a portion of the transmit signal emitted from transmit elements 202 (e.g. via mutual coupling between transmit and receive elements 202, 204.

The receive elements 204 may provide the receive signal (which includes coupled portions of the transmit signal) to a multichannel receive beamformer 224 having K receive channels. In embodiments, multichannel receive beamformer 224 may, for example, be the same as or similar to, digital receive beamformer 110 described above in conjunction with FIG. 1.

The reference letter K may represent the number of transceivers within the receive sub-array. Receive elements 204 may provide the receive signal and coupled portions of the transmit signal on K receive channels with each receive element 204 providing its received portion of the receive beam and received mutual coupling response on its respective receive channel. For example, receive element 204A would provide its received portion of the receive beam and received mutual coupling response to receive channel 224A of the multichannel receive beamformer 224.

According to an embodiment, noise may be added to the signals provided from the receive elements 204 to the multichannel beamformer 224 along the receive channels. For example, noise may be added to the received portion of the receive beam and received mutual coupling response as signals are coupled from receive element 204A to receive channel 224A of the multichannel beamformer 224. The signals passed from the receive elements 204 to the multichannel beamformer 224, may be expressed as:

$$y_r^k(n) = s^k(n) + n_r^k(n) + \Sigma_{j=1}^{J} h_m^{jk} * x_t^j(n), 1 \le k \le K \quad [\text{Eq. 4}]$$

Wherein $y_r$ is the signal passed from receive element 204 to multichannel receive beamformer 224, s(n) is an externally incident signal, $n_r$ is the receiver noise, and $h_m$ is the mutual coupling response (wherein $h_m^{jk}$ is the mutual coupling response from transmit element j to receive element k).

In an embodiment, the multichannel receive beamformer 224 may generate a receive beam from the portions of the receive signal provided by receive elements 204 on the K number of receive channels. The receive signal may, for example, be generated through the summation of the portions of the receive beam received on each receive channel of the multichannel receive beamformer 224. This may be represented as:

$$y_b(n) = \Sigma_{k=1}^{K} h_r^{k*} y_r^k(n) \quad [\text{Eq. 5}]$$

wherein $y_b$ is the receive beam 230 and $h_r$ is the response a receive channel of the multichannel receive beamformer 224.

According to an embodiment, the receive beam 230 may be provided to digital canceler 216. Digital canceler 216 may generate an isolated receive signal 232. Digital canceler 216 may, for example, generate the isolated receive signal 232 by combining the cancel signal 220 with receive beam 230. This may be represented as:

$$y(n) = y_b(n) + x_c(n) \quad [\text{Eq. 6}]$$

Further, this may be expanded as:

$$y(n) = \Sigma_{k=1}^{K} h_r^{(k)*}[s^{(k)}(n) + n_r^{(k)}(n) - \Sigma_{j=1}^{J} h_m^{(jk)} * n_j^{(j)}(n)] + \Sigma_{j=1}^{J} h_\varepsilon^{(j)} * [x_t^{(j)}(n) + n_t^{(j)}(n)], \quad [\text{Eq. 7}]$$

wherein $h_\varepsilon$ represents the mismatch of the canceling filter in the digital canceler 216. $h_\varepsilon$ may be represented as:

$$h_\varepsilon^{(j)} = h_c^{(j)} * h_t^{(j)} + \Sigma_{k=1}^{K} h_r^{(k)*} h_m^{(jk)}, 1 \le j \le J. \quad [\text{Eq. 8}]$$

It should be appreciated that any or all of digital adaptive canceler, digital transmit beamformer and digital receive beam former may be implemented via coding in a processor. For example, the processing may be performed by via a properly programmed digital signal processor (DSP) circuit or an application specific integrated circuit (ASIC). Functionally equivalent circuits may also be used.

Figure 3:
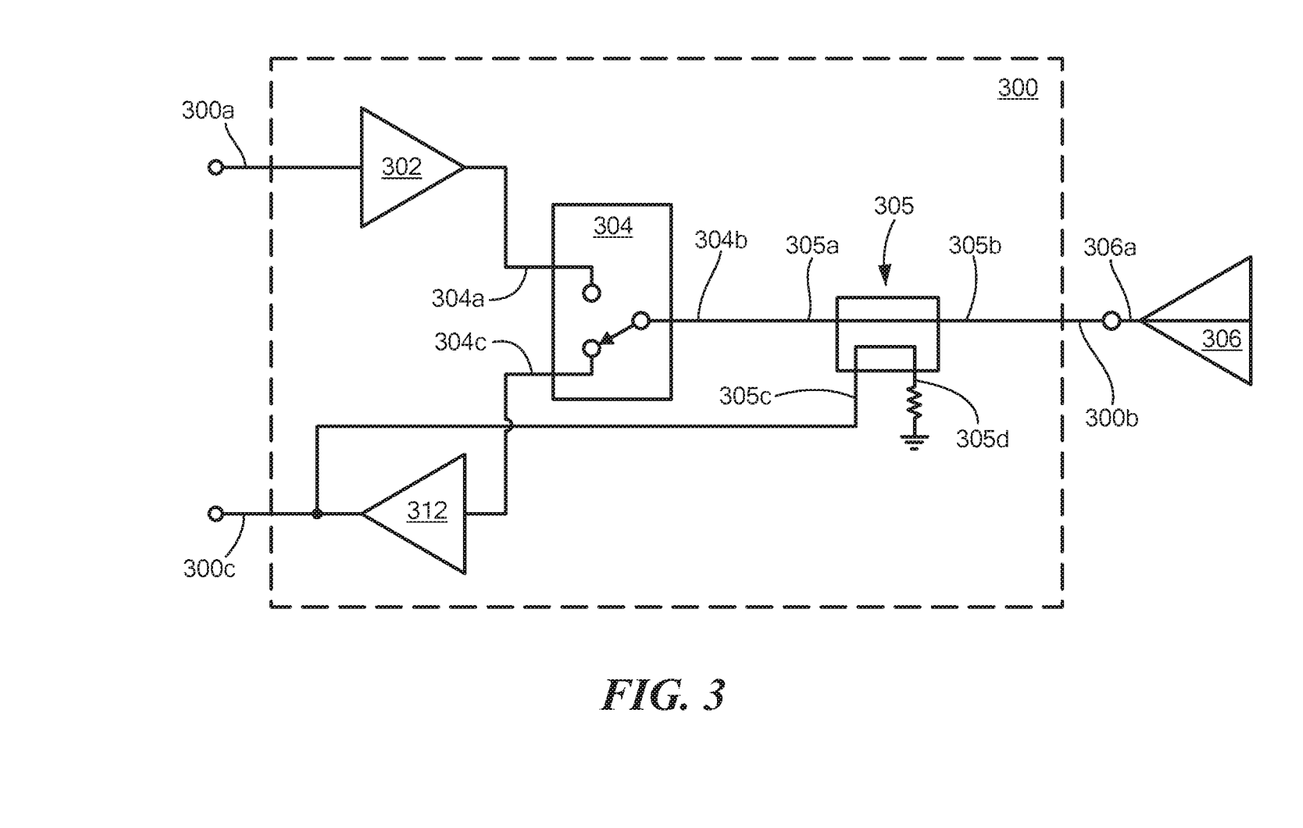
FIG. 3 is a schematic diagram of a transmit/receive (T/R) module which may be the same as or similar to a type used within the transceivers of FIG. 1.

Referring now to FIG. 3, an illustrative embodiment of a T/R module 300 which may be suitable for use in a STAR system which may be the same as or similar to system 100 described above in conjunction with FIG. 1 includes a transmit channel (or signal path) comprised of a transmit amplifier 302 and a switch 304. Transmit amplifier 302 may, for example, be provided as a power amplifier (PA). Amplifier 302 has an input coupled to an input 300a of T/R module 300 and an output coupled to a first terminal 304a of switch 304. A second terminal 304b of switch 304 is coupled to a first port 305a of a directional coupler 305. A second port of directional coupler 305b is coupled to an output 300b of T/R module 300 which in turn is coupled to a signal port 306a of an antenna 306 (here represented as a single antenna element, although in some embodiments may be a plurality of antenna elements).

When T/R module 300 is configured (or set) to operate in a transmit mode, switch 304 provides a low impedance signal path between the output of transmit amplifier 302 and T/R module output port 300b (and thus antenna signal port 306a). When a transmit signal propagates from amplifier 302 to antenna 306, a portion of the transmit signal is coupled, via coupler 305 from coupler ort 305c to the T/R module output 300c. Coupler port 300d has a termination 307 coupled thereto as is generally known. It should be appreciated that although T/R module is here shown to include a directional coupler, any means for coupling a portion of a transmit signal from the transmit signal path to a receive signal path may also be used. Coupler 305 has a coupling value selected such that the amount of radio frequency (RF) power diverted from the transmit path (and thus antenna 306) through the coupler 305 and to T/R module port 300c does not affect the operation of the system (e.g. such as system 100 in FIG. 1). In embodiments, coupler 305 may be provided having coupling value in the range of 40-100 dB. In preferred embodiments an 80 dB may be used. One of ordinary skill in the art, after reading the disclosure provided herein, will understand how to select a coupling element or coupling means having a coupling value suitable to fit the requirements of a particular application.

As per the discussion of FIG. 1, the phased-array antenna 100 may be configured into a transmit sub-array and a receive sub-array, with the transmit sub-array comprising transceivers configured to transmit and the receive sub-array comprising transceivers configured to receive. According to an embodiment, T/R module 300 may control the configuration of the transceivers within the phased-array antenna 100.

In an embodiment, the T/R module 300 may comprise a power amplifier, a low noise amplifier, an up convertor, a down convertor, a comparator, or any combination thereof—to name a few examples.

Figure 3A:
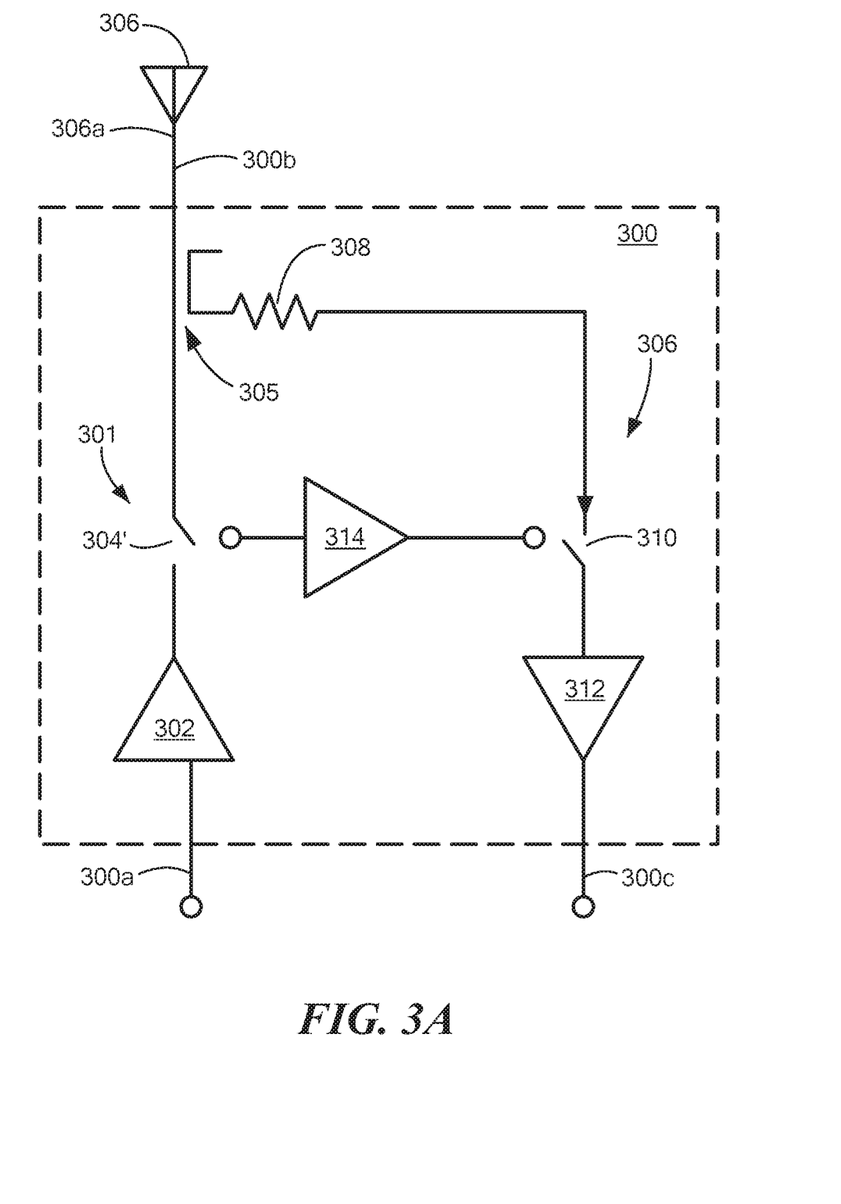
FIG. 3A is a schematic diagram of another embodiment of a T/R module which may be the same as or similar to a type used within the transceivers of FIG. 1.

Referring now to FIG. 3A, in which like elements of FIG. 3 are provided having like reference designations, another illustrative embodiment of T/R module 300' which may be the same as or similar to the type described above in conjunction with FIG. 1 includes a transmit channel (or signal path) 301 comprised of a transmit amplifier 302 and a switch 304'. Transmit amplifier 302 may, for example, be provided as a power amplifier (PA). Amplifier 302 has an input coupled to an input of the T/R module 300 and an output coupled to a first terminal of switch 304'. A second terminal of switch 304' is coupled to an output 300b of T/R module 300 which in turn is coupled to a signal port 306a of an antenna 306 (here represented as a single antenna element, although in some embodiments may be a plurality of antenna elements).

T/R module 300 further includes a means 305' for coupling a portion of a transmit signal from the transmit signal path 301 to a receive signal path 306. Here the means for coupling is provided as a directional coupler 305'. Other means known to those of ordinary skill in the art may, of course, also be used. An RF attenuator 308 (e.g. a controllable attenuator such as a digitally controllable attenuator) is coupled between coupler 305' and a first terminal of a switch 310 and is operable to change the level of an RF signal provided from coupler 305 to amplifier 312. A second terminal of switch 310 is coupled to an input of a first receive channel amplifier 312. An output of receive channel amplifier 312 is coupled to an output of the T/R module.

A third amplifier 314 has an input coupled to a third terminal of switch 304' and an output coupled to a third terminal of switch 310.

In operation, when T/R module 300' is configured (or set) to operate in a transmit mode, switch 304' provides a low impedance signal path between the output of transmit amplifier 302 and T/R module output port (and thus antenna signal port 306a). Similarly, switch 310 provides a low impedance signal path between a port of coupler 305' and an input of second amplifier 312. Thus, in a transmit mode of operation, amplifier 314 is disconnected from both the transmit receive signal paths.

When T/R module 300' is configured to operate in a receive mode of operation, switch 304 is positioned (or set) to provide a low impedance signal path between antenna port 306a and an input of amplifier 314 and switch 310 is configured to provide a low impedance signal path between an output of amplifier 314 and an input of receive path amplifier 312. Thus, a signal received via antenna element 306 propagates into T/R module 300' via port 300b and subsequently through switch 304', amplifier 314, switch 310 and amplifier 312 before reaching T/R module output port 300c within a phased-array antenna system such as system 100 described above in conjunction with FIG. 1.

As per the discussion of FIG. 1, the phased-array antenna 100 may be configured into a transmit sub-array and a receive sub-array, with the transmit sub-array comprising transceivers configured to transmit and the receive sub-array comprising transceivers configured to receive. According to an embodiment, T/R module 300 may control the configuration of the transceivers within the phased-array antenna 100.

In an embodiment, the T/R module 300 may comprise an operational element 302, operational element 304', operational element 312, switch 314, An operational element may comprise a power amplifier, low noise amplifier, an up convertor, a down convertor, a comparator, or any combination thereof—to name a few examples.

According to an embodiment, the positions of switches 314 and 316 may control the configuration of the T/R module. When a T/R module is configured to transmit, switch 314 may be in a position connecting operational element 302 with antenna 306, leaving no connection between operational element 302 and operational element 312. Further, switch 316 may be in a position connecting attenuator 310 to operational element 304, leaving no connection between operational element 312 and operational element 304. While the switches are in these positions, a T/R module is configured to transmit and will provide a transmit signal received at operational element 302 to antenna 306. Also, a T/R module in this transmit configuration will couple (via coupling means 305) or otherwise provide a portion of the transmit signal to the receive channel, effectively coupling the transmit and receive channels.

In an embodiment, switch 314 may be in a position connecting antenna 306 to operational element 312, leaving no connection between operational element 302 and antenna 306. Further, switch 316 may be in a position connecting operational element 312 to operational element 304', leaving no connection between impedance 310 and operational element 304'. While the switches are in these positions, a transceiver is configured to receive and the T/R module 300 will provide a signal to the T/R port 300C. In this configuration, no signal is transmitted so there is no coupling between the transceiver and receiver.

Figure 4:
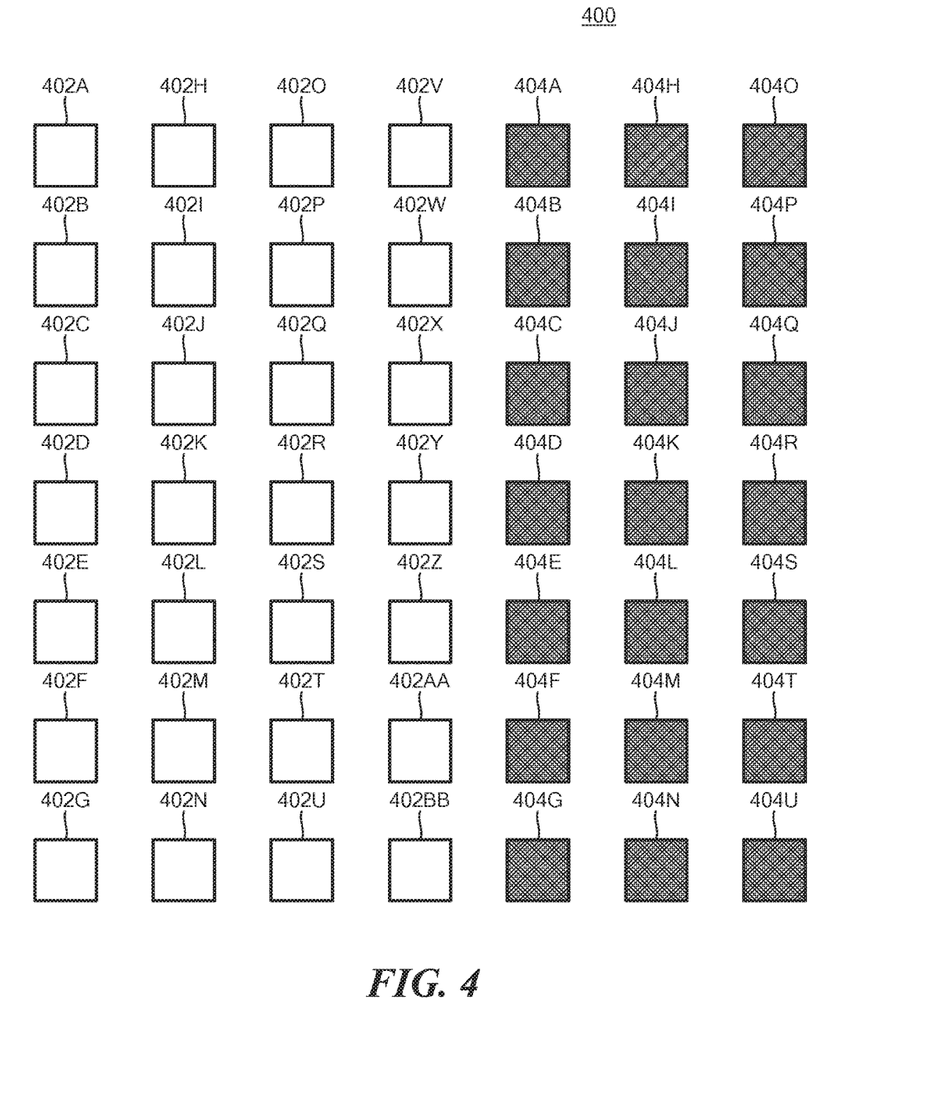
FIG. 4 is a block diagram of an example embodiment a transmit subarray and a receive subarray.
Figure 4A:
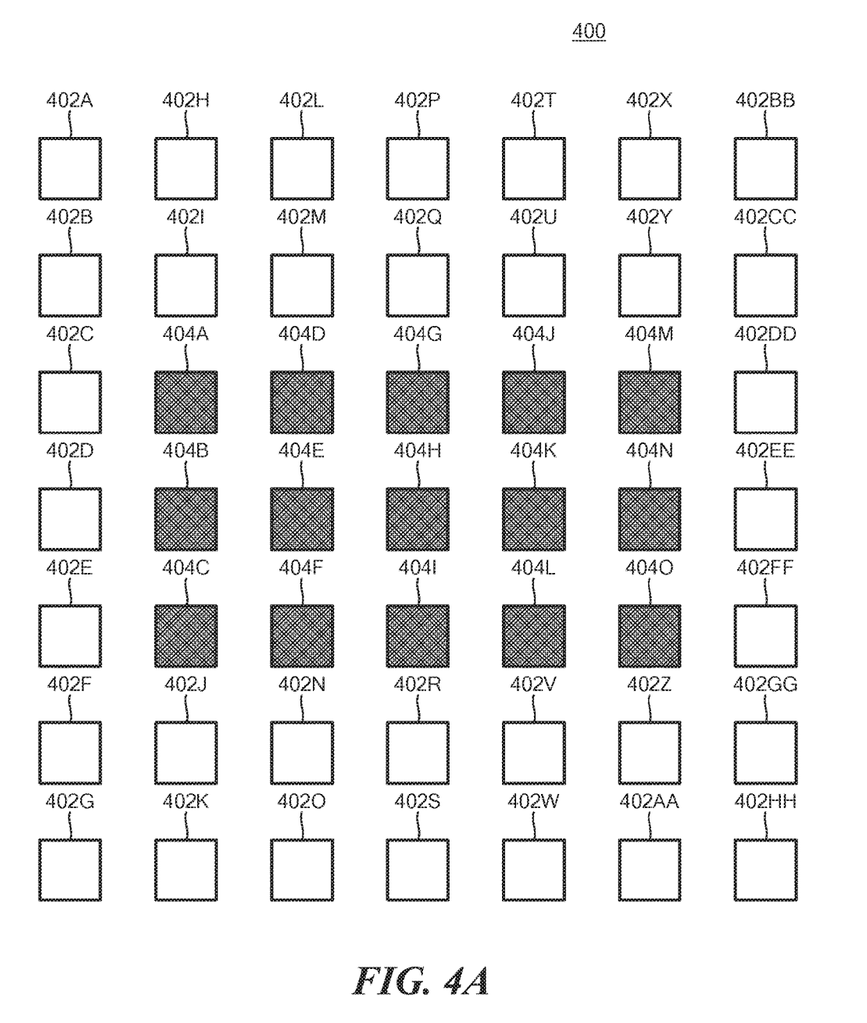
FIG. 4A is a block diagram of another example embodiment of a transmit subarray and a receive subarray.

FIGS. 4 and 4A are a block diagrams showing examples of transmit and receive sub-arrays which may be provided from a phased-array antenna 400. The phased-array antenna 400 may, for example, be the same as or similar to phased array antenna 106 described above in conjunction with FIG. 1. As per the discussion of FIG. 3, the transceivers within the phased-array antenna 400 may be configured to transmit or receive. Further, as discuss above for FIG. 1, a phased-array antenna may be configured into transmit and receive sub-arrays having a wide variety of different shapes.

Phased-array antenna 400 may include any number of transceivers which may be arranged in any order. For example, FIGS. 4 and 4A illustrate a phased-array antenna 400 in a 7×7 grid, though the phased-array antenna may be in any sized grid, or any other configuration. A transmit sub-array may be partitioned by configuring transceivers within the phased-array antenna 400 to transmit, and a receive sub-array may be partitioned by configuring transceivers with the phased-array antenna 400 to receive. A sub-array may contain any number of transceivers from the phased-array antenna 400, and the transceivers within a sub-array may be arranged in any order. For example, a first sub-array may be adjacent, surround, be surrounded by, separated from, or enclosed by a second sub-array.

As an example, FIG. 4 depicts a 7×7 phased-array antenna 400 partitioned into a transmit sub-array 402 and a receive sub-array 404, with the transmit sub-array 402 (comprising transceivers configured to transmit 402A-BB) adjacent to the receive sub-array 404 (comprising transceiver configured to receive 404A-U).

As another example, FIG. 4A depicts a 7×7 phased-array antenna 400 partitioned into a transmit sub-array 402 and a receive sub-array 404, with the transmit sub-array 402 (comprising transceivers configured to transmit 402A-HH) surrounding the receive sub-array 404 (comprising transceiver configured to receive 404A-O).

Figure 5:
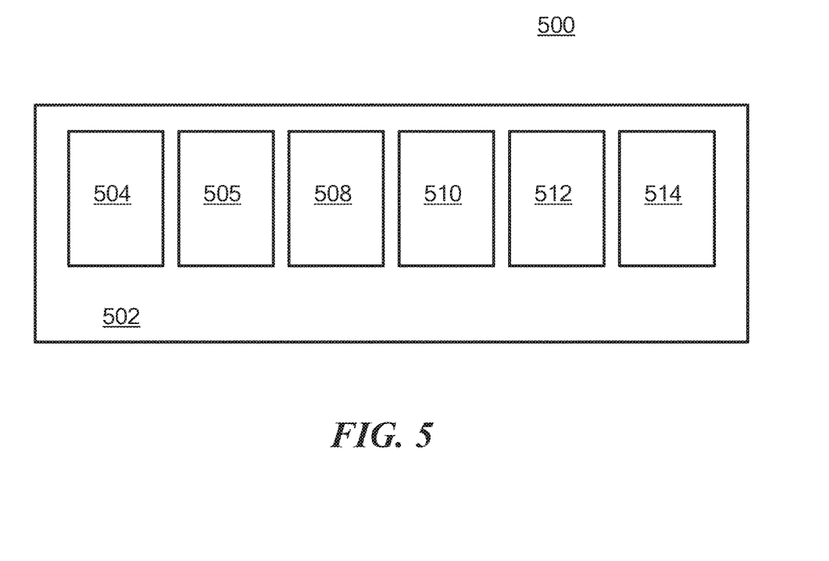
FIG. 5 is a block diagram of a linear patch array antenna.

FIG. 5 is a block diagram showing a linear patch array. FIG. 5 illustrates a linear patch array 500 for the phased-array antenna 100. According to an embodiment, the phased-array antenna 100 may comprise transceiver 504, transceiver 506, transceiver 508, transceiver 510, transceiver 512, and transceiver 514. These transceivers may be partitioned as per the discussion regarding FIGS. 4 and 4A.

What is claimed is:

1. In a phased array antenna having a plurality of antenna elements with each antenna element having at least one of a plurality of transmit-receive (TR) modules coupled thereto and the phased array antenna partitioned into first and second sub-array antennas, a method for simultaneous transmit and receive (STAR) operation comprising:
    transmitting, via the first sub array, a signal through a transmit channel of each TR module in the first subarray;
    coupling a portion of the transmitted signal from the transmit channel to an auxiliary receive channel coupled to the same antenna element as the transmit signal path; and
    receiving, via the second sub-array antenna, a receive signal comprising at least a portion of a signal of interest and at least a portion of the transmit signal;
    combining the coupled signal from the auxiliary receive channel and the receive signal to generate an isolated signal, wherein the isolated signal is generated using the portion of the transmitted signal from the auxiliary receive channel.

2. The method of claim 1, wherein combining the coupled signal from the auxiliary receive channel and the receive signal comprises:
    providing signals from a plurality of auxiliary receive channels to an adaptive digital canceler;
    providing signals from a plurality of receive channels coupled to the second sub-array antenna to the digital canceler; and
    combining the signal from the plurality of auxiliary receive channels with the signals from the plurality of receive channels to generate the isolated signal.

3. The method of claim 2, wherein providing signals from the plurality of receive channels coupled to the second sub-array antenna to the digital canceler comprises:
    providing signals from the plurality of receive channels coupled to the second sub-array antenna to a digital receive beamformer;
    forming one or more beamformed received signals; and
    providing the one or more beamformed received signal from the digital receive beamformer to the adaptive digital canceler.

4. The method of claim 3, wherein the combing further comprises:
    summing the portions of the transmitted signals from the auxiliary receive channels with the beamformed received signal.

5. A simultaneous transmit and receive system comprising:
    a receive subarray antenna provided from a first plurality of antenna elements;
    a transmit subarray antenna provided from a second plurality of antenna elements;
    a first plurality of transmit channels each having an input and having an output and each configured to be selectively coupled to a respective one of said first plurality antenna elements in said transmit sub-array antenna;
    a first plurality of auxiliary receive channels each having an input and having an output and each configured to be selectively coupled to a respective one of said first plurality antenna elements in said transmit sub-array antenna;
    a first plurality of coupling elements, each of said first plurality of coupling elements coupled one said first plurality of auxiliary receive channels and a corresponding one of said first plurality of transmit channels; and
    an adaptive digital canceler having plurality of inputs coupled to the outputs of said first plurality of auxiliary receive channels.

6. The simultaneous transmit and receive system of claim 5 further comprising:
    a plurality of receiver channels, each having an input coupled to said receive subarray antenna and each having an output coupled to an adaptive digital canceler.

7. The simultaneous transmit and receive system of claim 6 further comprising a digital receive beamformer coupled between the outputs of said plurality of receiver channels and an input of said adaptive digital canceler.

8. The simultaneous transmit and receive system of claim 7 further comprising:
    a transmit signal source having an output port; and
    a digital transmit beamformer having an input port coupled to the output port of said transmit signal source and having a plurality of outputs, each of the digital transmit beamformer outputs coupled to a corresponding one of the inputs of said first plurality of transmit channels.

9. A radio frequency (RF) system comprising:
    a plurality of transmit-receive (T/R) modules, each transmit-receive module comprising:
    at least one a receive channel; and
    a transmit channel;
    a coupling element configured to couple RF signals from said transmit channel to said receive channel;
    an adaptive canceler having a plurality of inputs and an output, each of said plurality of inputs coupled to a corresponding one said receive channels, such that in response to an RF transmit signal propagating in said transmit channel, said coupling element couples portion of the RF transmit signal to one of the plurality of inputs of said adaptive canceler.

10. The RF system of claim 9, wherein said adaptive canceler is configured to generate a cancel signal based upon the signal to be sent.

11. The RF system of claim 10, further comprising a second plurality of (T/R) modules and wherein said adaptive canceler is configured to generate an isolated signal based upon the cancel signal and a plurality of signals provided thereto from said second plurality of (T/R) modules.

12. The RF system of claim 11, further comprising a digital receive beamformer having a plurality of inputs coupled to outputs of said second plurality of T/R modules, and having an output coupled to said adaptive canceler, wherein in response to signals provided thereto from said second plurality of T/R modules, said digital receive beamformer summates the plurality of signals provided thereto and provides a receive beam signal to said adaptive canceler.

13. The RF system of claim 12, wherein said adaptive canceler combines the signals provided thereto from said first and second plurality of T/R modules to provide an isolated receive signal.

14. The RF system of claim 13, wherein said at least one a receive channel corresponds to an auxiliary receive channel.

15. The RF system of claim 14 wherein each T/R module further comprises a T/R switch coupled between said transmit channel and said receive channel.

\* \* \* \* \*